United States Patent [19]
Fecht

[11] 4,169,988
[45] Oct. 2, 1979

[54] RASTER DISTORTION CORRECTION CIRCUIT

[75] Inventor: Hans-Rudolf Fecht, Urdorf, Switzerland

[73] Assignee: RCA Corporation, New York, N.Y.

[21] Appl. No.: 898,434

[22] Filed: Apr. 20, 1978

[30] Foreign Application Priority Data

Jul. 25, 1977 [GB] United Kingdom ............... 31162/77

[51] Int. Cl.² ............................................. H01J 29/56
[52] U.S. Cl. ..................................... 315/371; 315/408
[58] Field of Search ........................ 315/370, 371, 408

[56] References Cited

U.S. PATENT DOCUMENTS 3,906,305  9/1975  Nillesen ................................ 315/399

OTHER PUBLICATIONS

Nillesen, *Electronic Application Lab. Report EDS* 7312, N.V. Philips Gloeilampenfabrieken, 4-17-73, pp. 1-18.

*Primary Examiner*—Theodore M. Blum
*Attorney, Agent, or Firm*—Eugene M. Whitacre; Paul J. Rasmussen; Joseph J. Laks

[57] ABSTRACT

A side pincushion correction circuit is coupled to a horizontal resonant retrace circuit which includes a retrace capacitor and a horizontal deflection winding. The correction circuit includes an inductance and a controllable switch which is turned on during each horizontal retrace interval. A compensating circuit comprising secondary winding of a flyback transformer is coupled to the inductance and reflects the inductance onto the primary winding side in series with the deflection winding when the switch is open circuited and reflects the inductance in parallel with the deflection winding when the switch is conducting. The on-off ratio of the switch during horizontal retrace is modulated at a vertical parabolic rate to achieve side pincushion correction. The turns ratio of the flyback transformer is selected to adjust the resonant frequency and the retrace time modulation created by the correction circuit.

8 Claims, 7 Drawing Figures

RASTER DISTORTION CORRECTION CIRCUIT

BACKGROUND OF THE INVENTION

This invention relates to raster distortion correction circuits for television receivers.

To correct for raster distortion, such as side pincushion distortion, typically, the peak trace current in the horizontal deflection winding is varied in a parabolic manner at the vertical scanning rate by a correction circuit coupled to the deflection winding. Certain correction circuits provide this peak horizontal trace current variation by including a saturable reactor in series with the deflection winding, the inductance of which is varied in a parabolic manner at a vertical rate.

Other correction circuits, such as diode modulator circuits, provide the peak horizontal trace current variation by coupling an inductor and a modulating capacitor in series with the deflection winding and trace capacitor. The voltages across each of the inductances are modulated during the trace interval at a vertical parabolic rate, the voltages across the inductances being 180° out-of-phase with each other. During each horizontal retrace interval, each inductance forms a separate resonant retrace circuit with respective retrace capacitors to achieve current reversal. The values of the retrace capacitors are selected to provide each resonant circuit with identical resonant retrace frequencies. To prevent the stray capacitance, leakage inductance, and load impedances of the flyback transformer from altering the above-described resonant frequencies, the junction of the deflection winding and diode modulator inductor is coupled through a retrace capacitor to a tap point on the flyback transformer primary.

Still other correction circuits provide the proper peak trace current variation by modulation during the horizontal retrace interval. Such circuits may include an inductance coupled to a controllable bidirectional switch and the horizontal deflection winding. During the second half of horizontal retrace, the retrace pulse energy in the retrace capacitor divides between the deflection winding and the inductance as a function of the on-off ratio of the switch during retrace. Varying the on-off ratio at a parabolic vertical rate corrects for side pincushion distortion. This on-off ratio variation will vary the effective inductance coupled to the retrace capacitor during horizontal retrace and change the resonant frequency of the retrace circuit causing retrace pulse time modulation. It is desirable when designing such a correction circuit to adjust such retrace pulse time modulation in a manner which will prevent the modulation from becoming excessive.

SUMMARY OF THE INVENTION

A deflection winding and a capacitance in a deflection circuit are coupled together to form a resonant circuit during a first interval. A raster distortion correction circuit is coupled to the resonant circuit and includes an inductance and a controllable switch coupled to said inductance. The duration of the first conductive state relative to said second conductive state within the first interval is varied by a control circuit coupled to the switch in a manner correcting for raster distortion. A compensating circuit is coupled to the inductance and couples the inductance in series with the deflection winding when the switch is in a first conductive state within the first interval and couples the inductance in parallel with the deflection winding when the switch is in a second conductive state within the first interval. The compensating circuit adjusts the resonant frequency of the resonant circuit for modulating the duration of the first interval of the resonant circuit to a desired amount.

DESCRIPTION OF THE INVENTION

Figure 1:
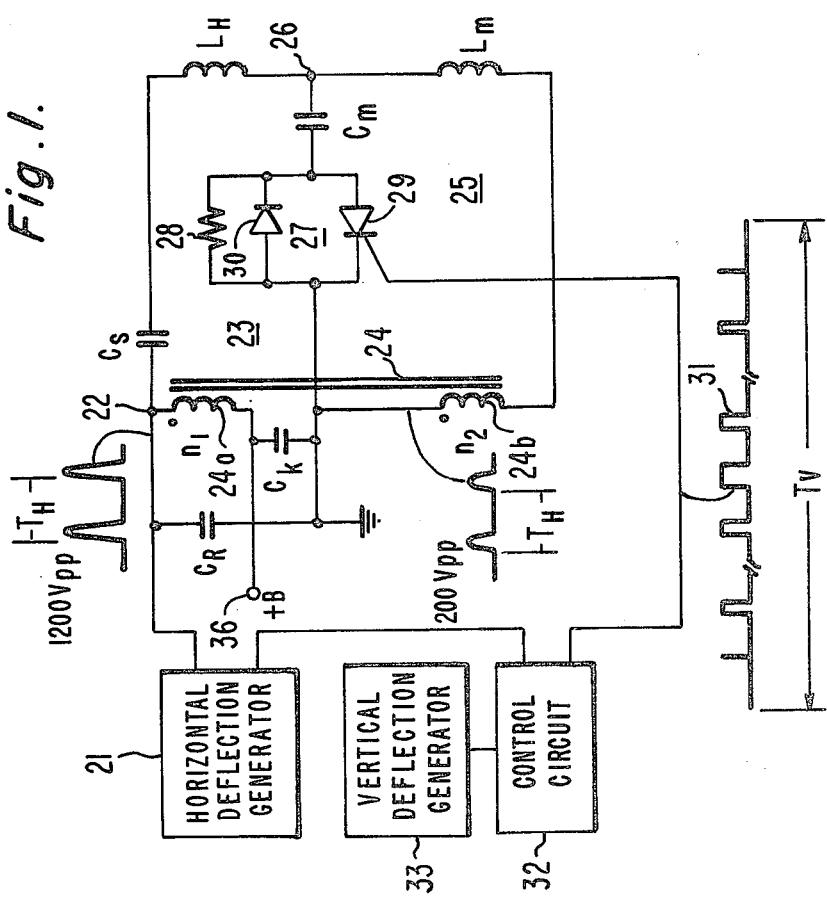
FIG. 1 illustrates a raster distortion correction circuit embodying the invention.

A horizontal deflection winding $L_H$ of FIG. 1 is coupled througnh an "S" shaping or trace capacitor $C_S$ to an output terminal 22 of a synchronized horizontal deflection generator 21. Horizontal deflection generator 21 may be of conventional design including a horizontal output switching device or transistor, not shown, coupled to output terminal 22 for developing a sawtooth deflection current during a trace interval of a horizontal deflection cycle. Coupled between output terminal 22 and ground is a retrace capacitor $C_R$ forming a resonant retrace circuit 23 with deflection winding $L_H$ for reversing direction of the deflection current during a resonant retrace interval.

Coupled across retrace capacitor $C_R$ is a series coupling of a DC blocking capacitor $C_K$ and a primary winding 24a of a horizontal output or flyback transformer 24. Flyback transformer 24 may include conventionally a high voltage secondary winding, not shown, for generating a high voltage ultor accelerating potential. A source of B+ voltage is coupled to a terminal 36, the junction of capacitor $C_K$, and primary winding 24a.

A raster distortion, east-west, or side pincushion correction circuit 25 is coupled to the resonant retrace circuit 23. A terminal 26 of deflection winding $L_H$ that is not coupled to "S" shaping capacitor $C_S$ is coupled to a first terminal of an inductor $L_m$ of correction circuit 25. A second terminal of inductor $L_m$ is coupled to ground through a secondary winding 24b of flyback transistor 24. Secondary winding 24b is magnetically coupled to primary winding 24a, with the winding polarities as illustratively indicated by the polarity dots of FIG. 1.

Terminal 26 is coupled to ground through a series coupling of a capacitor $C_m$ and a controllable bidirectionally conducting switch 27. A damping resistor 28 is coupled across switch 27. Switch 27 comprises a silicon controlled rectifier SCR 29 with an anode coupled to ground and a parallely coupled oppositely poled diode 30. Horizontal rate, $1/T_H$, pulse width modulated gating signals 31 are coupled to the gate of SCR 29 from a control circuit 32 to gate SCR 29 into conduction at a controlled instant within each horizontal retrace interval in a manner hereinafter to be described.

If, for example, side pincushion raster distortion correction is desired, the width modulation of pulses 31 occur at a parabolically varying vertical rate, $1/T_V$, thereby providing less peak-to-peak horizontal trace current in horizontal deflection winding $L_H$ during scanning of the top and bottom raster lines than during scanning of the center raster lines. For this purpose, both horizontal rate signals from horizontal deflection generator 21 and vertical rate signals from a vertical deflection generator 33 are coupled to control circuit 32.

Operation of correction circuit 25 for correcting side pincushion distortion will now be described with secondary winding 24b omitted from FIG. 1, and inductor $L_m$ coupled between terminal 26 and ground. Such circuit operation is also described in U.S. patent application Ser. No. 722,600, filed, Sept. 13, 1976, of Peter Eduard Haferl, entitled, PINCUSHION CORRECTION CIRCUIT, now U.S. Pat. No. 4,088,931. During horizontal retrace, the resonant circuit 23 is formed and comprises the retrace capacitor $C_R$ and an inductance $L_T$ coupled to retrace capacitor $C_R$. The inductance $L_T$ includes the inductance of horizontal deflection winding $L_H$. Each of capacitors $C_S$, $C_K$, and $C_m$ is of relatively large value compared to retrace capacitor $C_R$ and may be considered a short-circuit at the horizontal retrace frequency $1/T_R$. Thus, none of the capacitors substantially contributes any of its capacitance to the resonant circuit 23 capacitance.

During retrace, the deflection current through deflection winding $L_H$ reverses direction. Approximately halfway through the retrace interval, the current through $L_H$ is zero, and the retrace voltage at terminal 22 across retrace capacitor $C_R$ is at a maximum. Thus, substantially all of the energy available for deflection is stored in retrace capacitor $C_R$. Assuming the peak amplitude of the retrace voltage is stabilized in a conventional manner, the energy available for deflection will also be stabilized.

At the end of retrace, the retrace voltage at terminal 22 is approximately zero, and all the stored energy has been transferred to the deflection winding $L_H$, flyback transformer 24, and correction circuit 25.

During the first half of horizontal retrace and part of the second half, controllable switch 27 is open-circuited. After the center of retrace, but while switch 27 is an open circuit, current flows to ground from retrace capacitor $C_R$ through the series combination of deflection winding $L_H$ and inductor $L_m$. The retrace capacitor energy is proportioned between $L_H$ and correction circuit 25 in accordance with the ratio of inductances $L_H$ and $L_m$.

At a controlled instant in the second half of retrace, switch 27 is made conductive and remains a short circuit for the remainder of horizontal retrace interval. With switch 27 conductive, capacitor $C_m$ of correction circuit 25 represents a parallel low impedance path to ground when compared with inductor $L_m$. No substantial further retrace energy is stored in inductor $L_m$ of correction circuit 25. After switch 27 is made conductive, the energy remaining in retrace capacitor $C_R$ is substantially transferred only to deflection winding $L_H$.

The energy available for horizontal deflection is the relatively constant amount which is stored in the retrace capacitor in the middle of retrace diminished by the amount which is stored in correction circuit 25 inductor $L_m$. By varying in a predetermined manner the instant within the second half of horizontal retrace at which switch 27 is made conductive, the amount of energy stored in correction circuit 25 is also varied. The amount of deflection energy transferred by retrace capacitor $C_R$ to deflection winding $L_H$ is thereby also varied, resulting in a predetermined modulation of the peak horizontal deflection current.

Making switch 27 conductive shortly after the middle of retrace, results in a greater peak horizontal deflection current than when making switch 27 conductive at a later instant. Varying the turn-on instant of switch 27 in a parabolic manner at a vertical rate, produces a parabolic modulation of the peak horizontal deflection current, as is required for side pincushion correction.

Correction circuit 25 also modulates the "S" correction provided by capacitor $C_S$ during the horizontal trace period. The energy stored in inductor $L_m$ when switch 27 is made conductive initiates an oscillation in the parallel L-C circuit comprising inductor $L_m$ and a capacitor $C_m$. The resonance frequency is approximately $1/2T_H$. The current through $L_m$ comprises approximately a sinewave with a positive maximum near the end of the horizontal retrace interval and a negative maximum near the beginning of the next horizontal retrace interval. Thus, switch 27 remains conductive throughout the horizontal trace interval, thereby shunting substantially all of the horizontal trace current away from inductor $L_m$. Since the voltage across $L_m$ leads the current by 90 degrees in phase, an approximately parabolic voltage during trace is coupled to deflection winding $L_H$ at terminal 26 with a maximum amplitude oscillation near the center of horizontal trace.

Because the maximum amplitude oscillation is a function of the amount of energy stored in inductor $L_m$ of correction circuit 25, the maximum amplitude oscillation will vary in a parabolic manner at a vertical rate when correction circuit 25 provides side pincushion correction. This vertical rate variation is superimposed on the parabolic "S" shaping correction voltage provided by capacitor $C_m$, correcting for inside pincushion distortion associated with in-line color kinescopes, for example.

Besides modulating the peak horizontal deflection current and the "S" shaping voltage, correction circuit 25 also modulates the horizontal retrace pulse time duration $T_R$ at a vertical rate. The resonance frequency of resonant retrace circuit 23 is inversely proportional to the square root of $C_R \times L_T$, where $L_T$ equals the total inductance coupled to retrace capacitor $C_R$ of resonant retrace circuit 23. With switch 27 open-circuited, the total inductance $L_{T1} = L_H + L_m$, the sum of the series coupled deflection winding $L_H$ and inductor $L_m$. With switch 27 conducting, the total inductance $L_{T2}$ is less, with $L_{T2} = L_H$, since terminal 26 is now effectively short-circuited to ground through capacitor $C_m$ and switch 27.

For the center horizontal raster lines, switch 27 conducts for a greater portion of the retrace interval than it does for the top and bottom raster lines. The smaller inductance $L_{T2}$ is coupled to retrace capacitor $C_R$ for a greater portion of the retrace interval for the center raster lines, thereby modulating and shortening the retrace pulse time duration for the center raster lines.

A certain amount of such retrace time modulation may be desirable as it provides further inside pincushion distortion correction in addition to that provided by the modulation of the "S" shaping voltage. However, for certain large screen in-line kinescopes, for example, which require a relatively large amount of side pincushion correction, the retrace time modulation may become excessive. Excessive retrace time modulation may be undesirable for several reasons. Retrace pulses are typically used for timing and gating purposes in various television receiver circuits. These pulses should desirably be of constant width as well as amplitude. The high voltage accelerating potential may undesirably be modulated at a vertical rate. Undesirable corner stretching may occur with brightness level changes.

A feature of the invention is to control the amount of retrace pulse modulation provided by correction circuit 25. As illustrated in FIG. 1, inductor $L_m$ is not directly coupled to ground but is coupled through a secondary winding 24b of flyback transformer 24, which will compensate for retrace pulse modulation. Primary winding 24a comprises $n_1$ turns, and secondary winding 24b comprises $n_2$ turns for a primary winding—secondary winding turns ratio of $n = n_1/n_2$.

Figures 3A, 3B:
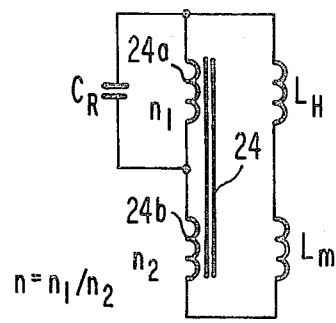
FIGS. 3 & 4 illustrate equivalent circuits useful in explaining operation of the circuit of FIG. 1.

As illustrated in FIG. 3a, during the portion of horizontal retrace that switch 27 is open-circuited, the deflection winding $L_H$ and inductor $L_m$ are series coupled to secondary winding 24b. Capacitors $C_S$ and $C_K$, because of their relatively large value with respect to capacitor $C_R$, have been replaced by short circuits. The total inductance $L_{T1}$ coupled to retrace capacitor $C_R$ equals the inductance $L_H + L_m$ reflected by secondary winding 24b onto the primary side of flyback transformer 24. As illustrated in FIG. 3b, $$L_{T1} = (n/n+1)^2(L_H+L_m)$$

when switch 27 is open-circuited.

Figures 4A, 4B, 4C:
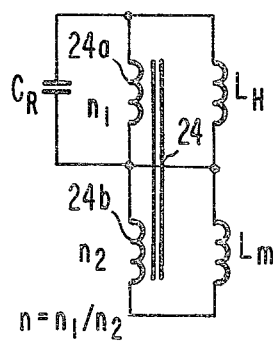

When switch 27 is conducting during the later portions of retrace, deflection winding $L_H$ is no longer series coupled to inductor $L_m$ but is directly coupled across retrace capacitor $C_R$, as illustrated in FIG. 4a. Only the inductance of inductor $L_m$ is now reflected onto the primary side as an inductance $L'_m = n^2 L_m$, as illustrated in FIG. 4b. The total inductance $L_{T2}$ coupled to retrace capacitor $C_R$ comprises the parallel arrangement of $L_H$ and $L'_m$. As illustrated in FIG. 4c, $$L_{T2} = (1/L_H + 1/n^2 L_m)^{-1}$$

when switch 27 is conducting.

The relative magnitudes of $L_{T1}$ to $L_{T2}$ is thusly a function of the turns ratio "n" of flyback transformer 24. To substantially eliminate retrace time modulation, the total inductance coupled to retrace capacitor $C_R$ during horizontal retrace should be unchanged whether or not switch 27 is open-circuited. That is, $L_{T1} = L_{T2}$. The turns ratio "n" required to substantially eliminate retrace time modulation is $n = L_H/L_m$.

A certain amount of retrace time modulation, provided it is not excessive, is desirable to provide for enhanced inside pincushion distortion correction. Thus, the turns ratio "n" should be slightly greater than $L_H/L_m$.

Figure 2:
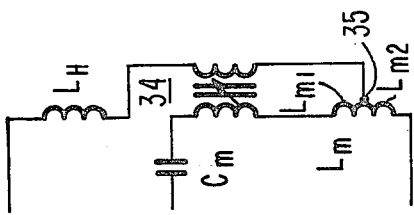
FIG. 2 illustrates portions of a second raster distortion correction circuit embodying the invention.

FIG. 2 illustrates a portion of another embodiment of the invention illustrated in FIG. 1. The deflection winding $L_H$ is coupled to a tap terminal 35 of inductor $L_m$ through a first winding of a linearity coil 34. A second winding of linearity coil 34 is coupled between capacitor $C_m$ and inductor $L_m$.

With switch 27 conducting, deflection winding $L_H$ is coupled to ground by means of tap terminal 35 through the parallel inductances $L_{m1}$ and $L_{m2}$ created by the tap. The tap turns ratio determines the capacitance value of capacitor $C_m$ required for modulation of the "S" shaping voltage and will also determine the amount of current flowing through the ITR when it is conducting. Varying the leakage inductance designed into inductor $L_m$ will vary the width of the corrected raster.

Values of selected components, voltages and currents of the circuit of FIGS. 1 and 2 are as follows:

$C_R = 12$ nanofarad
$C_K = 470$ nanofarad
$C_m = 390$ nanofarad
$C_S = 1$ microfarad
$L_H = 1.2$ millihenry
$L_{m1} = 50$ microhenry
$L_{m2} = 300$ microhenry
Leakage inductance of $L_m = 1(\mu H)$ microhenry
$R_{28} = 330$ ohms
B+ voltage for transistorized horizontal deflection generator $21 = +160$ VDC.

$$L_H/L_m = 4$$

$$n = n_1/n_2 = 6$$

What is claimed is:

1. A raster distortion correction circuit, comprising:
    a deflection winding;
    a deflection circuit coupled to said deflection winding for establishing first and second intervals within a deflection cycle;
    a capacitance coupled to said deflection winding for forming a resonant circuit during said first interval;
    an inductance coupled to said resonant circuit;
    a controllable switch coupled to said inductance;
    control means coupled to said controllable switch for providing control signals to said switch for changing the conductive states of said switch, said control means varying the duration of said first conductive state relative to said second conductive state within said first interval in a manner correcting for raster distortion; and
    compensating means for coupling said inductance during said first interval in series with said deflection winding when said switch is in one of said first and second conductive states and for coupling said inductance during said first interval in parallel with said deflection winding when said switch is in the other of said first and second conductive states for adjusting the resonant frequency of said resonant circuit during said first interval for adjusting the duration of said first interval to a desired amount.

2. A circuit according to claim 1, wherein said control signals vary at a vertical rate for varying the duration of said first conductive state relative to said second conductive state at a vertical parabolic rate for providing side pincushion distortion correction.

3. A circuit according to claim 2, wherein said compensating means comprises a transformer with a first winding coupled to said resonant circuit and with a said second winding coupled to said inductance, the turns ratio of said first winding to said second winding selected to adjust said duration to said desired amount.

4. A circuit according to claim 3, wherein said turns ratio approximately equals $L_H L_m$, where $L_H$ equals the inductance value of said deflection winding and $L_m$ equals the inductance value of said inductance.

5. A circuit according to claim 2, wherein said controllable switch is bidirectionally conductive.

6. A circuit according to claim 5 including a second capacitance coupled to said controllable switch for forming a second resonant circuit with said inductance when said switch is conductive for providing an "S" shaping correction voltage.

7. A circuit according to claim 6, wherein varying the duration of said first conductive state relative to said second conductive state at a vertical parabolic rate modulates said "S" shaping correction voltage at a vertical rate for providing inside pincushion distortion correction.

8. A circuit according to claim 7, wherein said compensating means comprises a transformer with a first winding coupled to said resonant circuit and with a said second winding coupled to said inductance, the turns ratio of said first winding to said second winding selected to adjust said duration to said desired amount.

* * * * *